(12) United States Patent
Davé et al.

(10) Patent No.: US 10,908,004 B2
(45) Date of Patent: Feb. 2, 2021

(54) AIRFLOW SENSOR AND SYSTEM

(71) Applicant: Onicon Incorporated, Largo, FL (US)

(72) Inventors: Paresh Davé, Santa Rosa, CA (US); Matthew Maragos, Rohnert Park (CA); William J. Sell, Petaluma, CA (US)

(73) Assignee: ONICON INC., Largo, FL (US)

( * ) Notice: Subject to any disclaimer, the term of this patent is extended or adjusted under 35 U.S.C. 154(b) by 0 days.

(21) Appl. No.: 16/510,291

(22) Filed: Jul. 12, 2019

(65) Prior Publication Data

US 2020/0033166 A1 Jan. 30, 2020

Related U.S. Application Data

(60) Provisional application No. 62/697,675, filed on Jul. 13, 2018.

(51) Int. Cl.
*G01F 1/40* (2006.01)
*G01F 15/12* (2006.01)

(52) U.S. Cl.
CPC .............. *G01F 1/40* (2013.01); *G01F 15/125* (2013.01)

(58) Field of Classification Search
CPC .............. G01F 1/34; G01F 1/40; G01F 15/12
See application file for complete search history.

(56) References Cited

U.S. PATENT DOCUMENTS

| | | | |
|---|---|---|---|
| 2,602,521 A | 7/1952 | Smith | |
| 4,320,665 A | 3/1982 | Cain | |
| 4,453,419 A | 6/1984 | Engelke | |
| 5,038,773 A | 8/1991 | Norlien et al. | |
| 5,123,288 A | 6/1992 | Tench et al. | |
| 5,908,990 A | 6/1999 | Cummings | |
| 6,079,627 A | 6/2000 | Kettler | |
| 6,129,113 A | 10/2000 | Van Becelaere | |
| 6,149,515 A | 11/2000 | Van Becelaere | |
| 6,619,141 B2 * | 9/2003 | Danninger | G01F 1/363 702/98 |
| 6,772,627 B2 * | 8/2004 | Fleming | G01M 9/04 73/147 |
| 7,000,480 B2 | 2/2006 | Kramer | |
| 7,543,759 B2 | 6/2009 | George | |
| 8,286,506 B2 | 10/2012 | Speldrich | |
| 8,939,036 B2 | 1/2015 | Kelley | |
| 9,267,700 B2 | 2/2016 | Bach et al. | |
| 9,423,283 B2 | 8/2016 | Strom et al. | |
| 9,551,601 B2 | 1/2017 | Strom et al. | |
| 9,857,209 B2 | 1/2018 | Ishihara et al. | |
| 10,036,601 B2 | 7/2018 | DeSomma et al. | |
| 2015/0268118 A1 * | 9/2015 | Pyle | G01F 1/34 73/861.75 |
| 2018/0094956 A1 | 4/2018 | Hansen et al. | |

FOREIGN PATENT DOCUMENTS

| | | |
|---|---|---|
| DE | 44 07 969 A1 | 9/1994 |
| JP | 6-258107 A | 9/1994 |
| JP | 2004198271 A | 7/2004 |
| WO | WO-2004/106864 A1 | 12/2004 |

* cited by examiner

Primary Examiner — Jewel V Dowtin

(74) Attorney, Agent, or Firm — Blank Rome LLP

(57) ABSTRACT

Differential pressure airflow sensor devices are disclosed. Disclosed are sensor devices for mounting on a fixed resistance having a low-pressure probe for extending through the fixed resistance from a housing and a high-pressure inlet to the housing. Disclosed are sensor devices having a plurality of pressure transducers.

17 Claims, 16 Drawing Sheets

AIRFLOW SENSOR AND SYSTEM

RELATED APPLICATIONS

This application claims priority to U.S. provisional application 62/697,675 filed on Jul. 13, 2018, the entirety of which is incorporated by reference herein.

FIELD OF INVENTION

The present invention relates to devices for airflow measurement.

BACKGROUND

Many ventilation systems are more effective when the actual air flow through the system, or portion of a system is known. Outside airflow measurement (OAM), the airflow entering a building through a duct, is an important measurement for any building heating, ventilation, and air conditioning (HVAC) system for human health and safety. Often, OAM is written as a mandatory measurement into many standards and codes. However, OAM is a difficult and cumbersome measurement to make with traditional flow measuring. Prior methods of monitoring air flow include manometers (pressure meters), such as pitot tube designs, or in combination with orifice plates, venture, and thermal dispersion type flow meters, each of which require specialized installation customization and/or minimum straight duct runs both upstream and downstream of the flow measurement. In most installation configurations, the ducts do not meet such straight run requirements. There are also additional challenges with prior methods, which require the installation of a pressure sensing probe downstream of the duct inlet, when there is limited or no access downstream of the inlet. In addition, prior methods of monitoring air flow include inlets open to the airflow causing it to be prone to clogging, include multiple mounting installation points requiring complex installations, and/or have a limited range of differential pressure. Stringent duct configurations combined with the environment challenges of wind, gusts, dust, dirt, rain and snow affecting the measurement and clogging the flow sensors make prior known OAM systems inadequate.

SUMMARY

Disclosed herein are devices for sensing airflow in a duct. In one aspect of the in disclosure, the devices include a housing adapted to be mounted to a plate extending across the airflow of the duct, the plate having fixed airflow resistance, a high static pressure tube opening from the housing to the upstream side of the fixed resistance plate; and a low static pressure tube opening from the housing to the downstream side of the fixed resistance plate at a distance sufficient to avoid substantial airflow turbulence caused by the fixed resistance plate; and the device is in communication with a transmitter and/or a controller for communicating pressure readings.

In another aspect of the disclosure, at the fixed resistance plate is a louvre. In yet another aspect of the disclosure, at the fixed resistance plate is expanded metal. In a further aspect of the disclosure, at least one of the high static pressure tube opening and the low static pressure tube opening includes a sintered metal filter to filter debris in the airflow. In another aspect of the disclosure, the device is in electrical, wireless, and/or pneumatic communication with the transmitter and/or controller. And in yet another aspect of the disclosure, the device further includes at least two transducers within the housing, to generate signals based on relatively lower and higher pressure differentials, respectively.

In one aspect of the disclosure, two transducers are each connected to the low static pressure tube opening. In another aspect of the disclosure, two transducers are each connected to a circuit and the circuit converts the signals to at least one of a wired and wireless communication protocol. In yet another aspect of the disclosure, the device includes spacers between the housing and the plate. In a further aspect of the disclosure, the spacers establish an airgap between the plate and the housing, and the airgap adapted to allow a static pressure to equalize through the spacers.

Disclosed herein in one aspect of the disclosure is a device for sensing airflow in a duct, the device including: a housing; at least two transducers within the housing, to generate signals based on relatively lower and higher pressure differentials, respectively; a transverse probe having circular tube wall, and a total pressure conduit and a static pressure conduit within the circular tube wall; a static pressure tube from the housing to the static pressure conduit; and a total pressure tube from the housing to the total pressure conduit. In another aspect of the disclosure, each of the two transducers are in pneumatic connection with each of the static pressure conduit and the total pressure conduit.

DETAILED DESCRIPTION

Disclosed herein are sensor devices and systems used to measure airflow, for example airflow in a ventilation system or other duct, e.g., OAM. The disclosed example sensor devices and systems have been designed to overcome the problems noted in the prior art and work with any known fixed resistance device, like, for example, a louver or a perforation plate. Example disclosed sensor devices and systems are adapted to measure a differential pressure across this fixed resistance and work with most existing duct configurations without modification to the respective duct inlet configuration, for example, without removal of major components like a louver, rain hoods, and/or air handler unit dampers. Example disclosed sensor devices and system components are installed from the upstream side of a fixed resistance device and all connections are on the upstream side of the fixed resistance device, which are generally easy to access. In addition, example disclosed sensor devices and systems are not materially affected by environmental constrains, e.g., rain, wind, snow, atmospheric pressure.

Disclosed embodiments include a unitary housing which protects the device in locations subjected to harsh outdoor environments, for example, fresh air inlet plenums for building air circulation systems.

Figure 1:
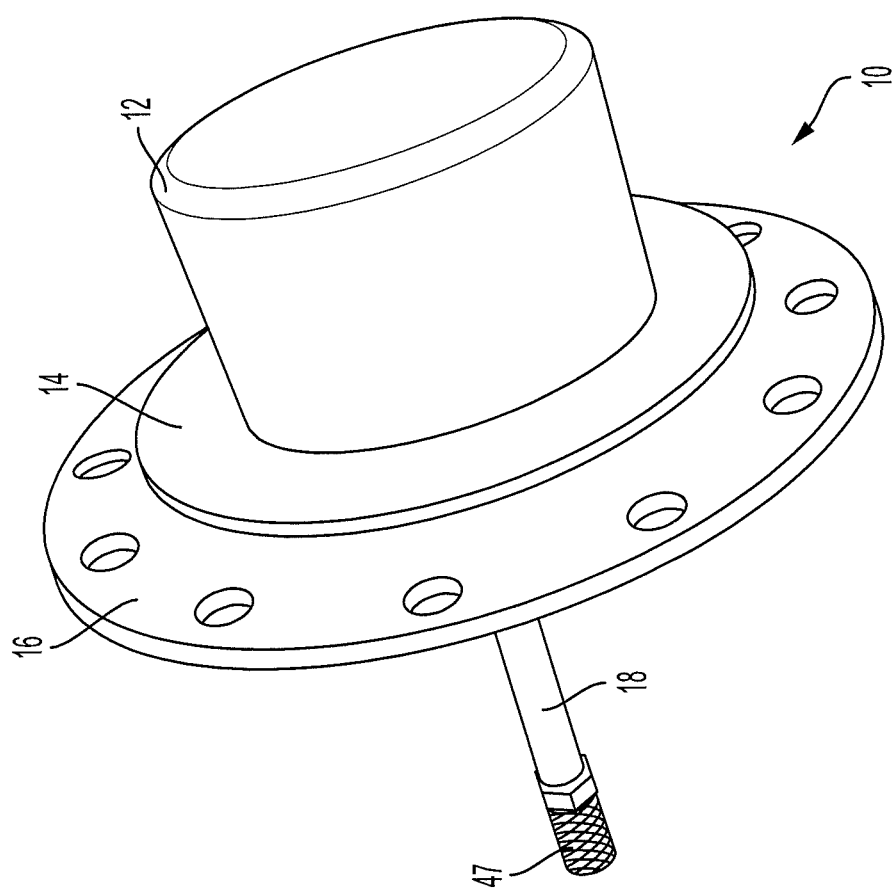
FIG. 1 shows a perspective view of an example sensor device in accordance with disclosed embodiments.

FIG. 1 shows a sensor device 10 prior to installation. Example sensor device 10 includes a head or a housing 12. The housing 12 may, in one configuration, include a flange 14 or other similarly configured plate, discussed in more detail below. The sensor device 10 of FIG. 1 also has a mounting plate 16 for mounting the sensor 10. Extending from the housing 12 is low-pressure probe 18, which may, in one example, include a filter 47. The filter 47, in one example, is a filter capable of filtering debris within the airflow from entering the low-pressure probe 18, for example a metal sintered filter.

Figure 2:
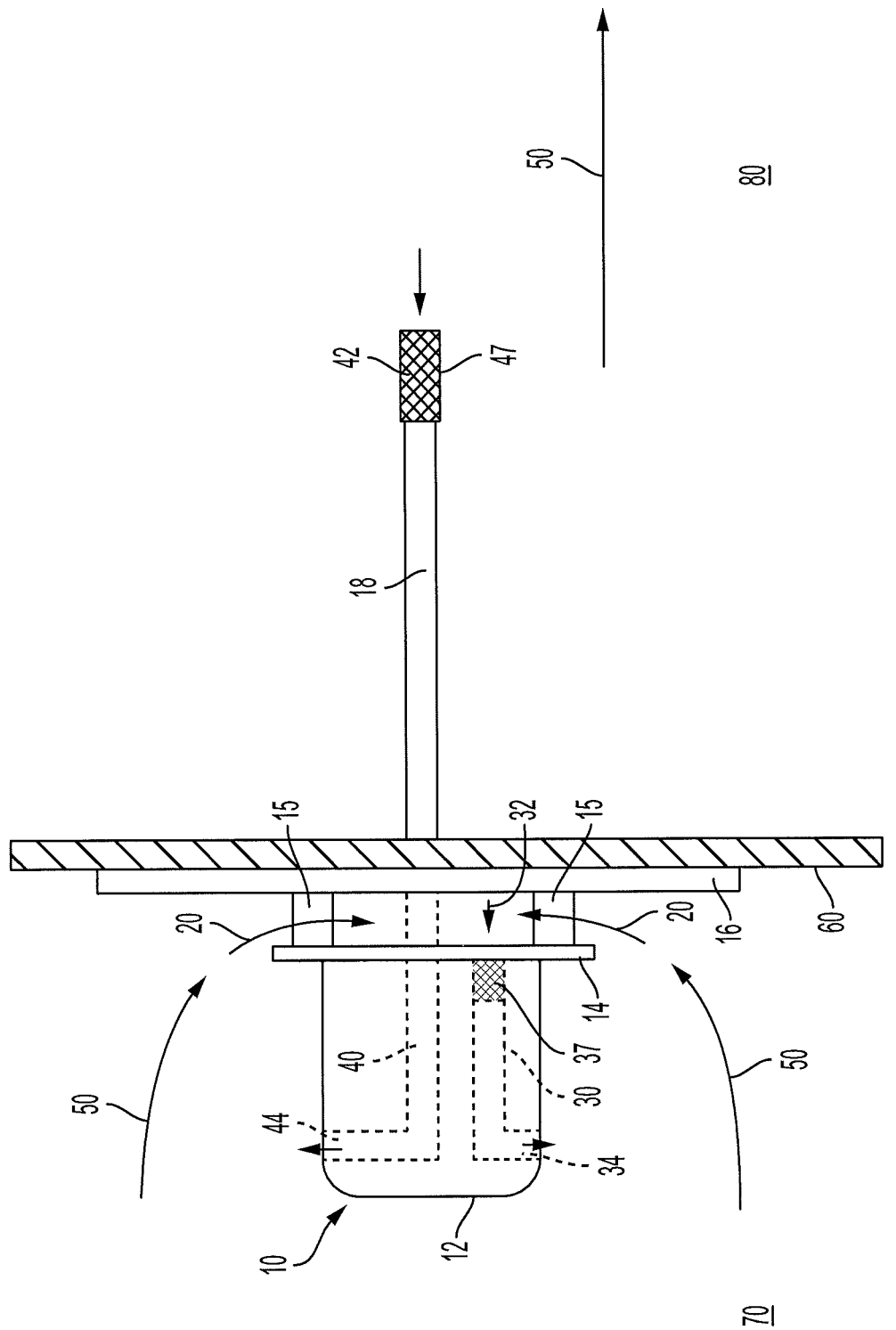
FIG. 2 a cross section of a sensor device of FIG. 1 in accordance with disclosed embodiments.

FIG. 2 is a cross section of the sensor device 10 after installation onto a fixed resistance 60. The fixed resistance 60 may be, for example, a louver, metal grate, expanded metal, or other screen, grid, or mesh type material that is capable of passing air through it at a known, or measurable, fixed resistance. Applicant notes that although dust and debris may slightly alter the fixed resistance over an extended period of time, the change is negligible to the fixed resistance character as it relates to sensor device 10 and the remainder of this disclosure.

As shown, the airflow 50 is from left to right. The sensor 10 is mounted to the fixed resistance 60 though mounting plate 16 and any mechanical connection known in the art, e.g., fasteners, rivets, screws, welds, as well as others. The housing 12, though the flange 14, is mechanically connected to the mounting plate 16 though the spacers 15 to establish an airgap 20 between the mounting plate 16 and the housing 12/flange 14. As air flows, pressure builds up in the region 70 in front of the fixed resistance as compared to the region 80, the higher static pressure on the upstream side of the fixed resistance 60 equalizes through the spacers 15 and is applied to the high-pressure tube 30, which is mounted within the housing 12. The high-pressure tube 30 has a high-pressure inlet 32 adjacent the air gap 20 formed by the spacers 15 and the flange 14. The high-pressure tube 30 also has a high-pressure outlet 34 to connect the high-pressure tube 30 to a pressure sending unit, manometer, or the high-side of a pressure transducer cell through tubing. The high-pressure tube 30 may include on its end a high-pressure filter 37, for example, a sintered metal filter for removing debris and allowing air pressure to pass through such as the same used for the filter 47. One suitable example of the filters 37 and 47 is a pneumatic exhaust muffler, for example those available from Clipper Instrument Laboratory, Inc. of Cincinnati Ohio.

Also connected to the housing 12, and extending through the mounting plate 16 and the fixed resistance 60, is a low-pressure probe 18 having a low-pressure inlet 42 at the end furthest away from the housing 12. The low-pressure probe 18 may be terminated at the low-pressure inlet 42 with a low-pressure filter 47 made of similar construction as high-pressure filter 37. The low-pressure probe 18 is connected to a low-pressure tube 40, which connects the low-pressure probe 18 to a low-pressure outlet 44. The low-pressure outlet 44 may connect the low-pressure tube 40 to a pressure sending unit, transmitter, manometer, other controller, or the low-side of a pressure transducer cell though tubing (not shown) such that the static pressure from the low-pressure side of the fixed resistance 60 is pneumatically communicated through the low-pressure probe 18, the low-pressure tube 40, and the low-pressure outlet 44 to the pressure sending unit.

An associated system, discussed below, utilizes the sensor device 10 to measure the static pressure drop across the fixed resistance 60. The described sensor device configuration, including the arrangement of the housing 12, the low-pressure probe 18, and the high-pressure tube 30 provides a pressure sensor to be placed on a fixed resistance to measure airflow directly that is effective in expected weather conditions at the installation site and is resistant to moisture and other particulates which may affect the air flow reading. In addition, while previous sensor configurations required a duct to be straight for a minimum distance for accurate measurements, the arrangement of the sensor device 10 components and its mounting configuration provide airflow measurements in both straight run ducts and ducts without straight runs. The sensor device 10 does not have any straight-run requirements. Yet another benefit is that the sensor device can be factory-characterized according to the known material of fixed resistance 60 so the user/installer does not need to field-calibrate, which decreases installation time.

Figure 3:
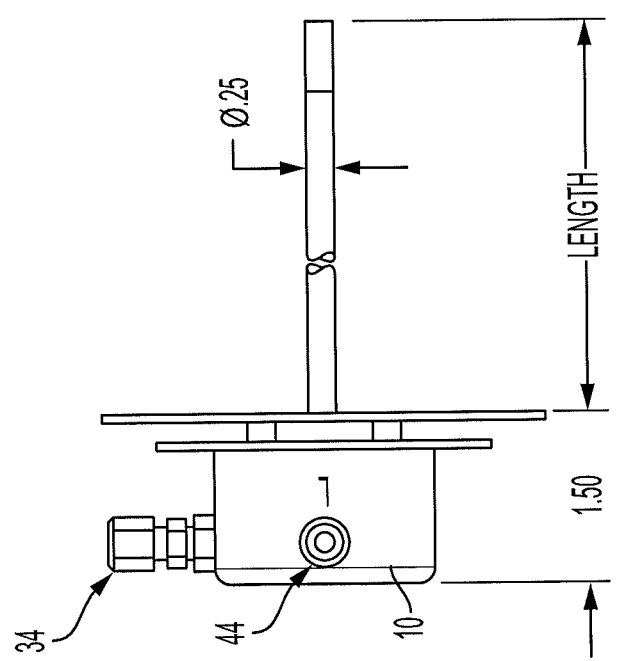
FIGS. 3 and 4 show side and front schematic views, respectively, of an example sensor device in accordance with disclosed embodiments.
Figure 4:
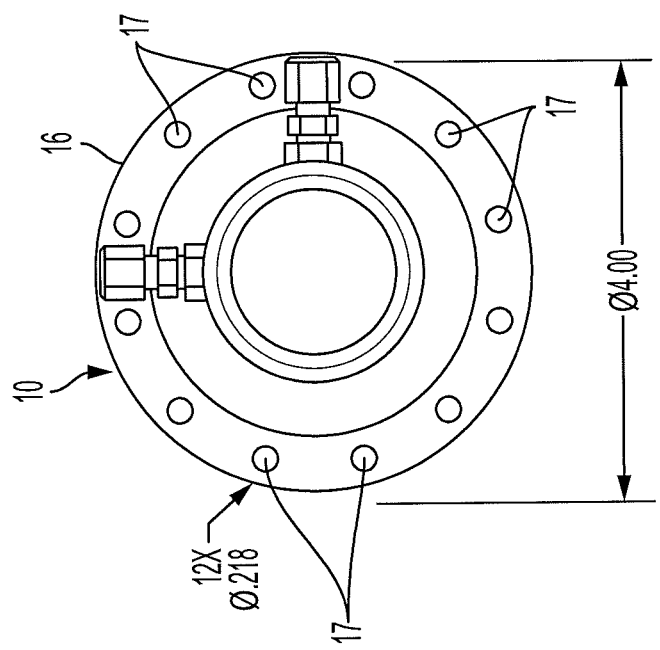

FIGS. 3 and 4 show side and front schematic views, respectively, of an example sensor device 10. FIG. 3 shows example compression fittings for a pneumatic connection to the low-pressure inlet 44 and the high-pressure inlet 34 attached to the housing 12. As shown the housing, flange, spacers, and mounting plate portions of the sensor device 10 (except for the low-pressure probe 18) extends, in this example for about 1.5 inches and the probe extends for a length of about 3 inches from mounting plate 16 and a diameter of about 0.25 inches. However, it should be noted that dimensions may be altered for a particular installation configuration, e.g., different louver or expanded metal grate configurations. For example, the length of the low-pressure probe 18 may extend a sufficient distance from the mounting plate 16 (and the fixed resistance 60, not shown) to avoid substantial airflow turbulence caused by the sensor device 10, the mounting plate 16, and/or the fixed resistance 60. Yet, the length of the low-pressure probe 18 should preferably be small enough to avoid interference from duct features such as dampers or other physical obstructions. FIG. 4 shows a front view of FIG. 3 and shows example mounting holes, for example about 12 mounting holes 17 each having a diameter of about 0.218 inches and a mounting plate 16 diameter of about 4.00 inches. Although, it should be noted that other dimensions and the number of mounting holes suitable to a particular installation can also be used.

Figure 5:
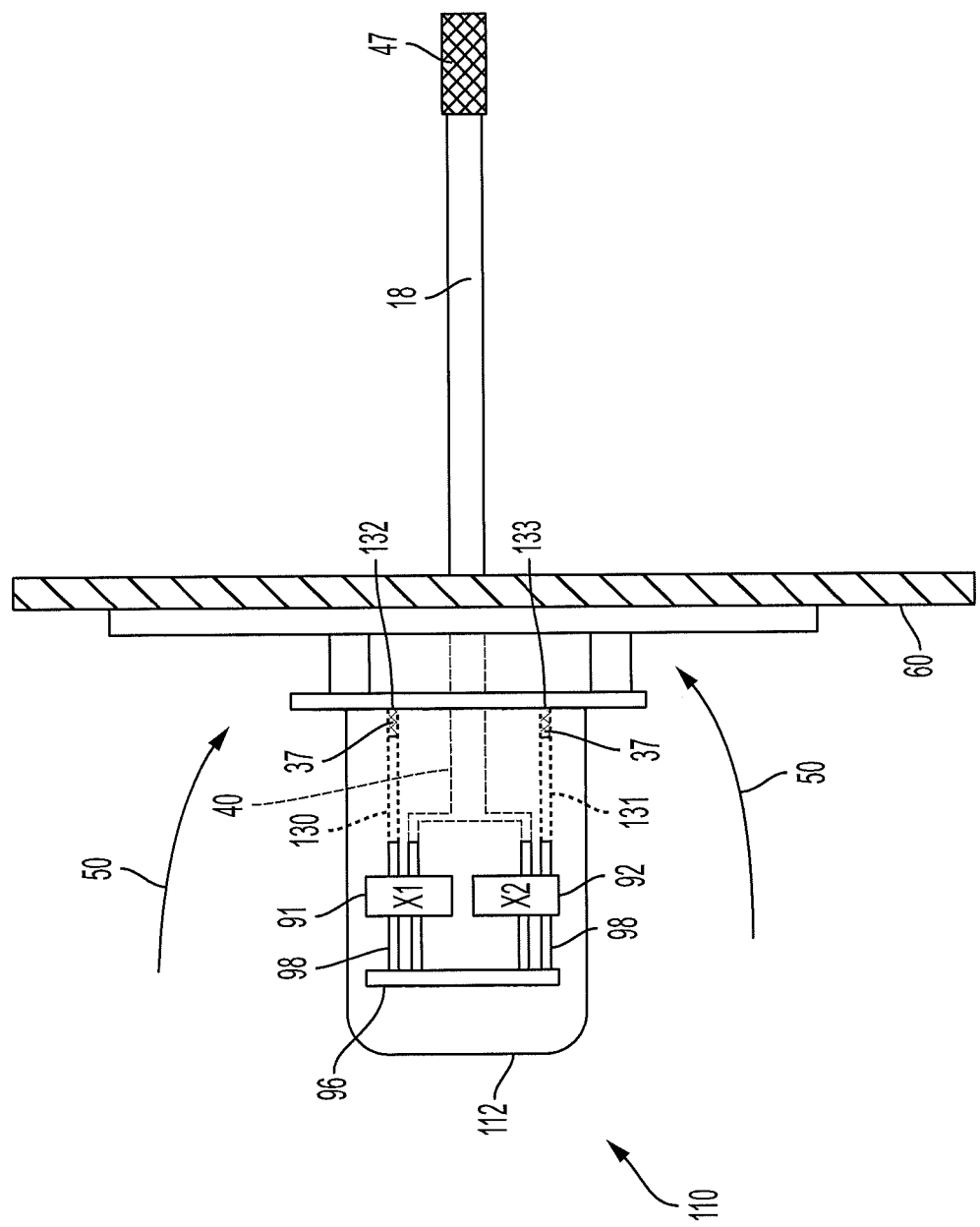
FIG. 5 shows cross section of a sensor device in accordance with disclosed embodiments.

FIG. 5 shows another embodiment of a sensor device 110. The sensor device 110 is of similar construction to the sensor device 10 of FIGS. 1-4 in that it includes a housing 112, a mounting plate 116 for mounting to a fixed resistance 60, spacers 115, a low-pressure probe 118, and optionally filters 37 and 47. However, instead of pneumatically passing the static high and low-pressures from the respective high and low-pressure inlets through the housing, the sensor device 110 includes transducers 91, 92 within the housing 112 and includes no pneumatic piping to a remote transmitter. Instead the pressure readings are converted to electrical signals within the sensor device 110 housing 112 and the sensor readings are transmitted electronically. It should be noted, that although the sensor device 110 shows two transducers 91, 92, other embodiments may include just one transducer or more than two transducers.

Each of the transducers 91, 92 are differential pressure transducers that convert differential pressure into an electrical signal. For example, differential pressure transducers can include transducers based on thermal flow-thru technology. In one example, each of the transducers 91, 92 has a different pressure sensing range from the other transducer allowing a single sensor device 110 to have an overall larger differential pressure sensing range than if the sensor device 110 only used a single transducer. For example, transducer X1 may operate for pressure differential from two Pascals to 25 Pascals and transducer X2 may operate for pressure differentials from 25 Pascals to 2500 Pascals. Then the sensor device 110 may operate in differential pressures from 2 Pascals to 2500 Pascals. In an alternative configuration, two pressure transducers may have the same differential pressure range as each other and controller software determines from which transducer to receive readings according to differing pressure ranges.

As shown in FIG. 5, each of the transducers 91, 92 is pneumatically connected to a high-pressure tube 130, 131 connected to a high-pressure inlet 132, 133. In an alternative, each of the high-pressure tubes 130, 131 may be connected to a single high-pressure inlet. Each of the transducers 91, 92 is pneumatically connected to low-pressure tube 140, which is therein connected to a low-pressure probe 18.

The transducers 91, 92 will output an electrical signal indicative of differential pressure of air flow to circuit boards 96 through electrical connections 98. The circuit boards 96 have electrical connections to communicate the signal to a controller or transmitter through technologies known in the art, e.g., wired or wireless communication.

Figure 6:
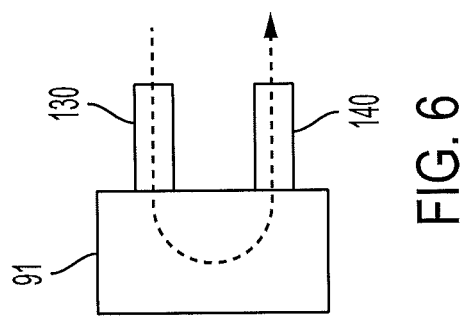
FIG. 6 shows an example transducer in accordance with disclosed embodiments.

FIG. 6 shows an example transducer 91. The transducer 91 has an inlet and an outlet for measuring pressure based on airflow through the transducer as described previously.

Figure 7:
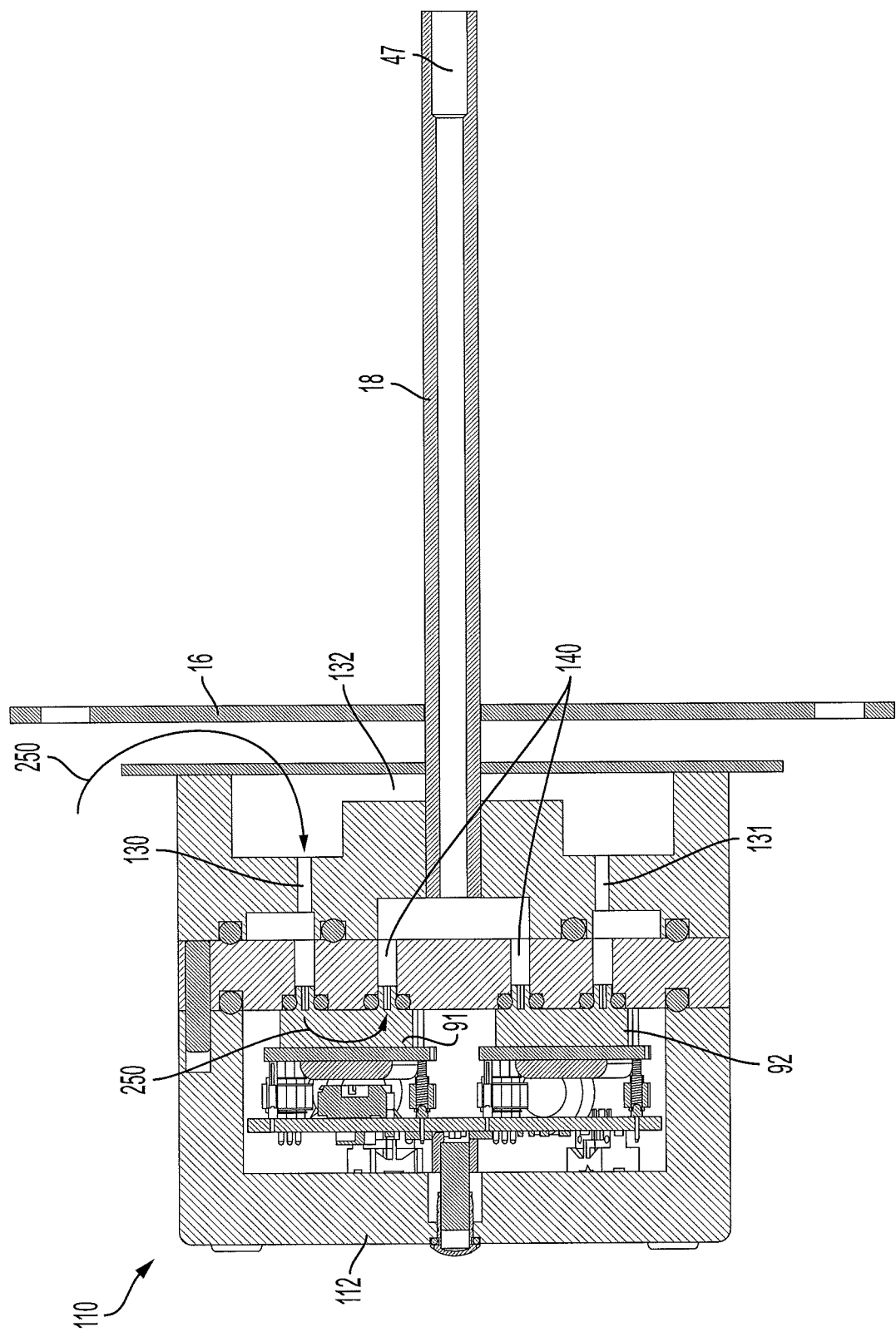
FIG. 7 shows a schematic cross section view of an example sensor device in accordance with disclosed embodiments.

FIG. 7 shows a schematic view of an example sensor device 110. The arrows 250 indicate the example air flow through the transducer 91. There are two sensors or transducers 91, 92 shown in the section view, but only one side, transducer 91, shows the flow path 250 as an example. The sensor device 110 of FIG. also shows a combined high-pressure inlet 132 feeding both high-pressure tubes 130 and 131.

Sensor device 110 of FIGS. 5-7 operates on the same principle as sensor device 10. In addition, sensor device 110 provides remote conversion of differential pressure to an electrical signal for communication to a centralized instrument or controller. The sensor device 110 can be daisy-chained, so multiple sensors can be placed on, for example, a serial bus or mesh or relay network. This feature adds opportunities such as split mode and dual transmitter mode (explained later). In addition, process air temperature can be measured using transducers 91, 92. Therefore, no separate thermometer (or similar resistance temperature detector (RTD)) is required. Another advantage of the sensor device 110 is that the stage transducers 91, 92 allow for a large turndown (100:1 on flow). This means example systems are capable of monitoring extremely low flows to high glows with the same accuracy. For example, a flow of 5000 feet per minute (FPM) will measure to within 5% accuracy and a flow of 50 FPM will also measure to within 5% accuracy.

Whether using the sensor device 10 or the sensor device 110, the addition of multiple sensors to an air handling unit (AHU) which is a split unit (it has two flow controls), allows the sensor device to be placed on both fixed resistances where the measurement can be used to control the minimum flow into the building to meet regulations, but reduce the energy consumption required to get the air to a comfortable temperature in economizer mode. Dual mode also allows multiple smart sensor devices 110 to be placed onto a serial, or similar, bus. Multiple sensor device 110 can be supported based on the design of the input/output (I/O) bus. For example, in one example up to (4) sensor devices 110 are supported. This allows for a single transmitter to have dual functionality (e.g., two logical transmitters in one physical device).

Each of the sensor device 10 and the smart sensor device 110 are intended to be interfaced to a central "transmitter." The transmitter may have local transducers to convert the pneumatic pressure signals of a sensor device 10 or use the digital signal from the smart sensor device 110. The transmitter can be adapted to accept any standard type of signal (e.g., pneumatic, electrical, or wireless) and have a controller to convert those signals to air flow based on known fixed resistance and correlated pressure differentials. This determination is scaled to analog outputs for reading on a meter or sent digitally to, for example, a building control system, or to the cloud.

Figure 8:
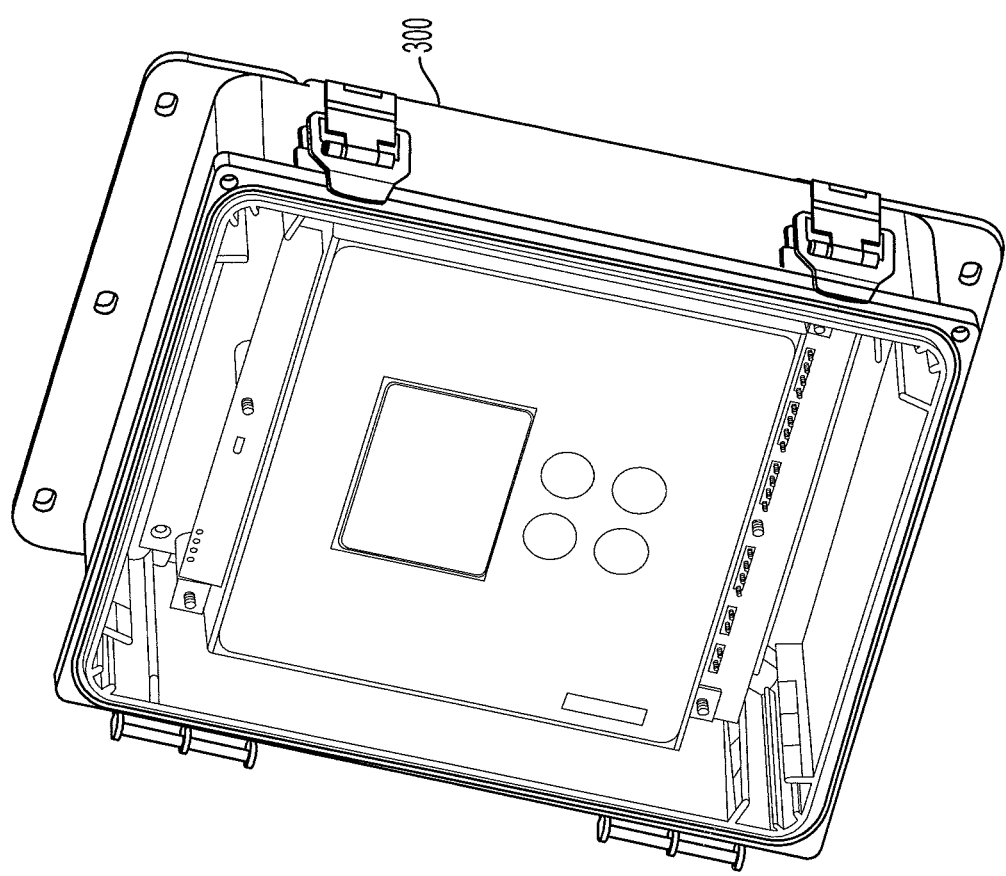
FIG. 8 shows a perspective view of a transmitter in accordance with disclosed embodiments.
Figure 9:
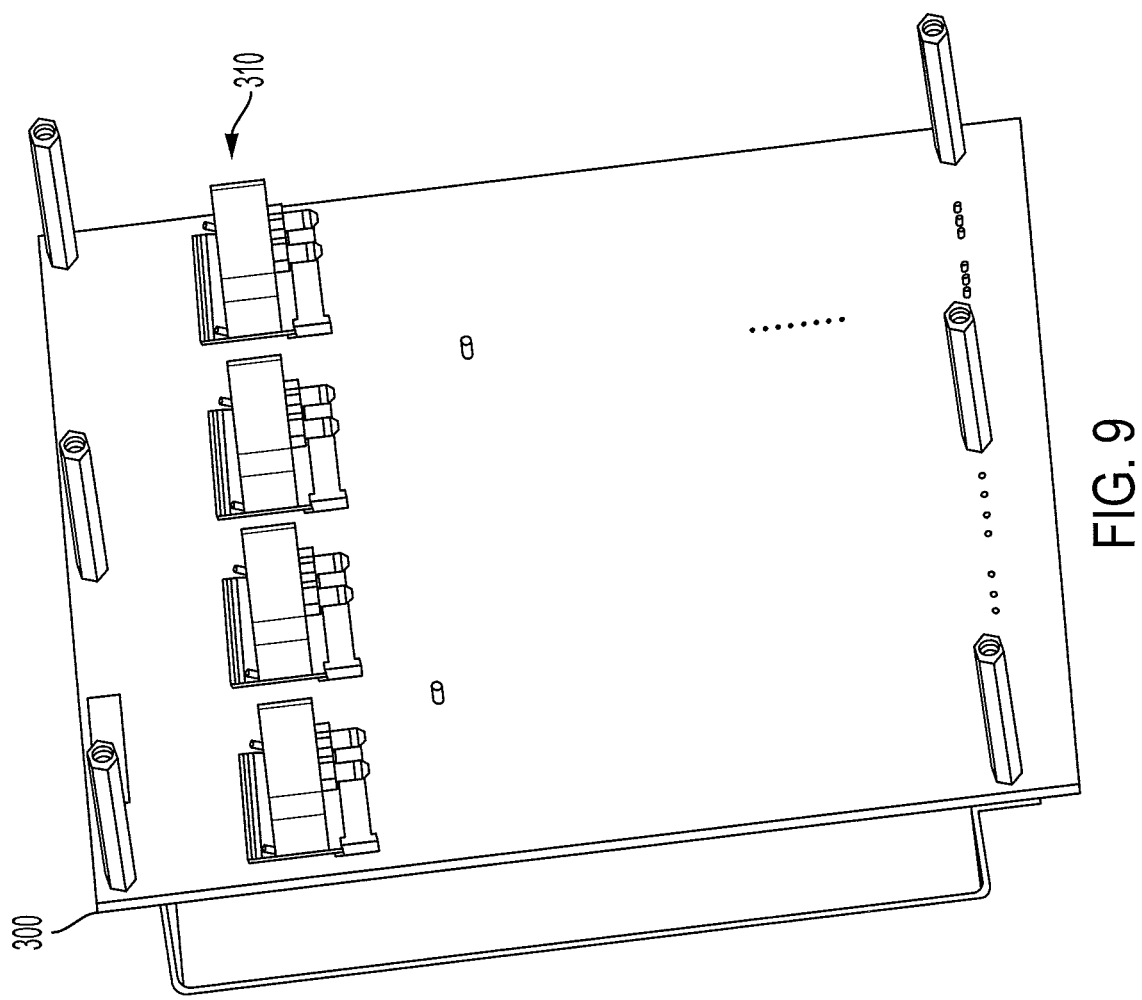
FIG. 9 shows a perspective view of the transmitter in FIG. 8 in accordance with disclosed embodiments.

Example perspective views of the front and back of a transmitter 300 are shown in FIGS. 8 and 9. FIG. 9 shows connection ports 310 for connecting to, for example the sensor device 10 pneumatically or, in another example, digital interfaces to the sensor device 110. The transmitter 300 includes a touchscreen user interface and membrane buttons to configure the system. The transmitter 300 performs mathematical analysis of the signal allowing for scaling, filtering and curve fits on the data collected from one or more sensor devices 10, 110.

Figure 10:
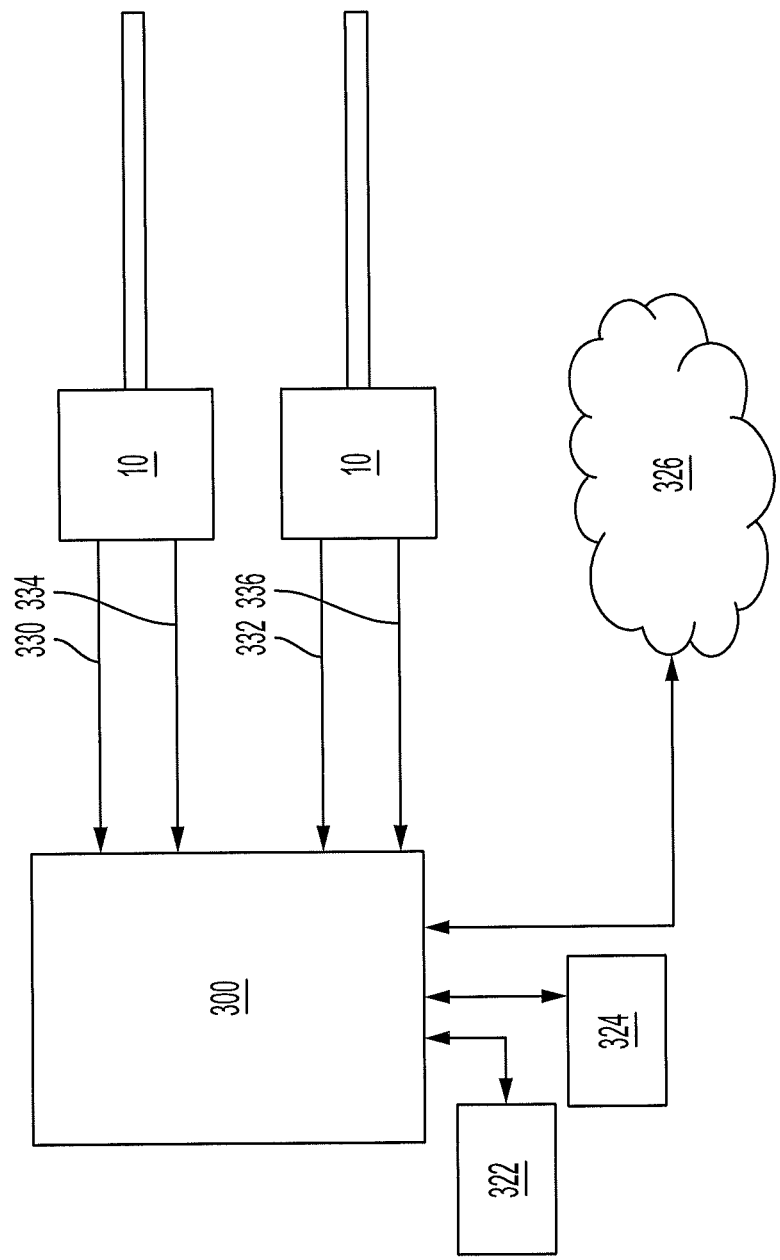
FIG. 10 shows a schematic view of a system incorporating sensor devices in accordance with disclosed embodiments.
Figure 11:
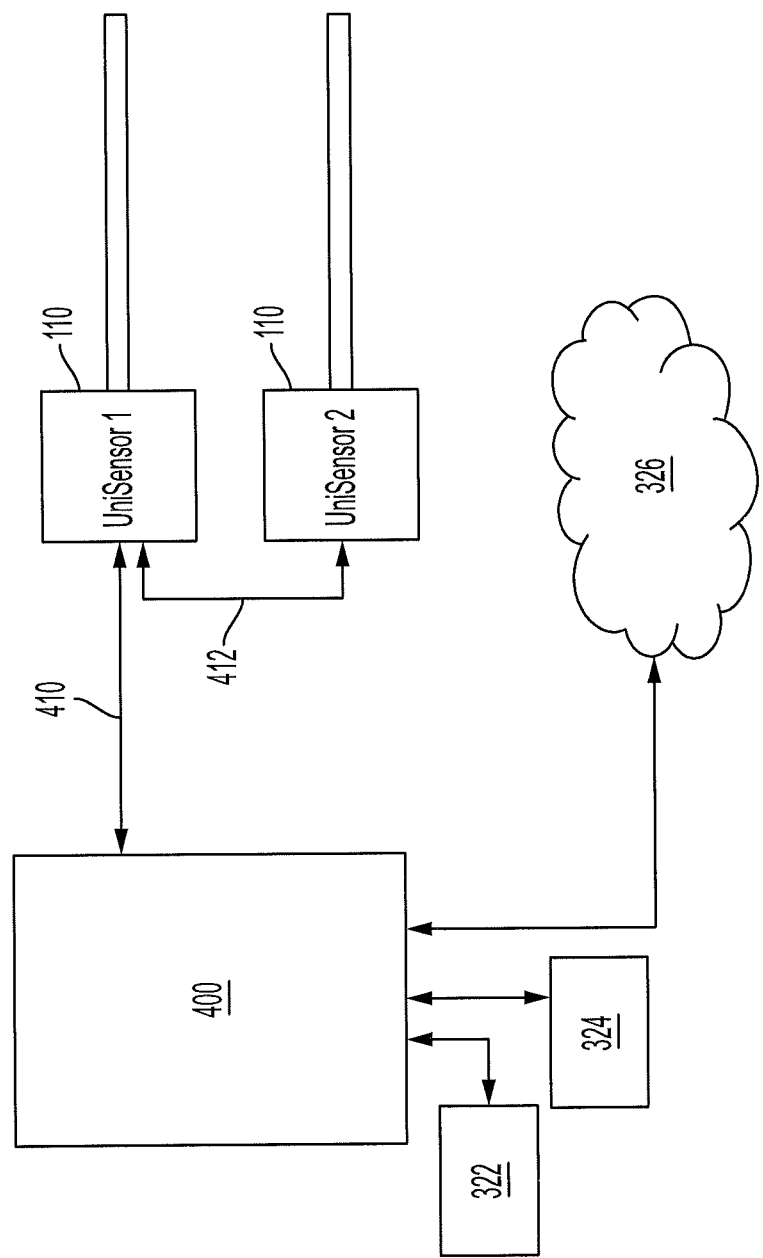
FIG. 11 shows a schematic view of a system incorporating sensor devices in accordance with disclosed embodiments.

FIGS. 10 and 11 show schematic views of the sensor devices 10 and 110 incorporated into systems, respectively. FIG. 10 shows a transmitter 300 receiving pneumatic low 330, 332 and high 334, 336 signals from the sensor devices 10, once completing its analysis, outputting its signals to one of a digital 322, analog 324, or cloud computer 326 (internet protocol (IP)) outputs. FIG. 11. shows the transmitter 400, which is similar to transmitter 300, but instead receiving digital data 410, for example RS485 serial data, from the sensor devices 110. The sensor devices 110 may be connected in any way known in the art to the transmitter 400. For example, the sensor devices 110 may be connected via wired or wireless signals, for example, but not limited to infrared, radio waves, fiber optic, or conductive wires. In addition, the sensor devices 110 may be connected 412 in serial, parallel, ad-hoc, or mesh network configurations.

Figure 12:
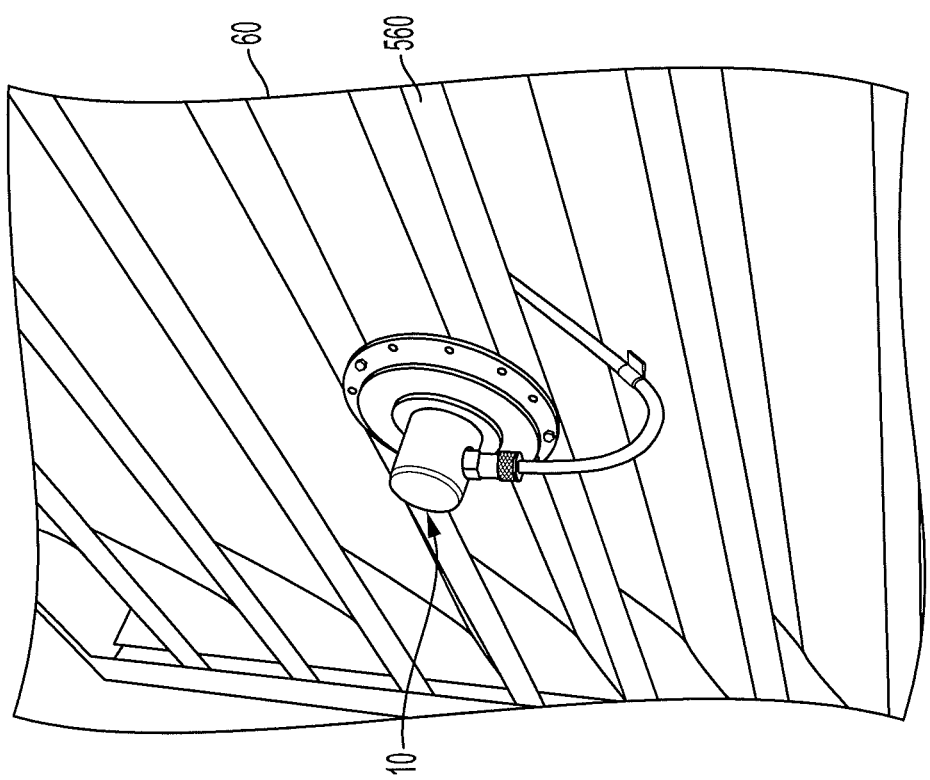
FIG. 12 shows a perspective view of an installed sensor device in accordance with disclosed embodiments.
Figure 13:
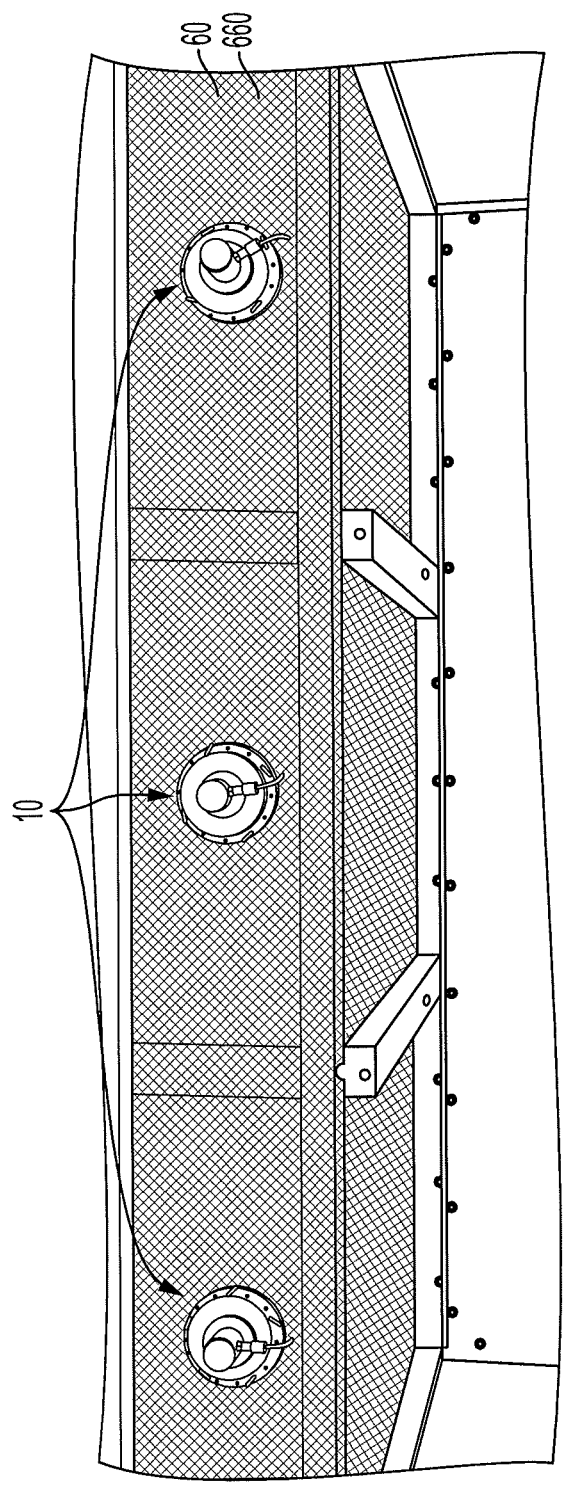
FIG. 13 shows a perspective view of an installed sensor device in accordance with disclosed embodiments.
Figure 14:
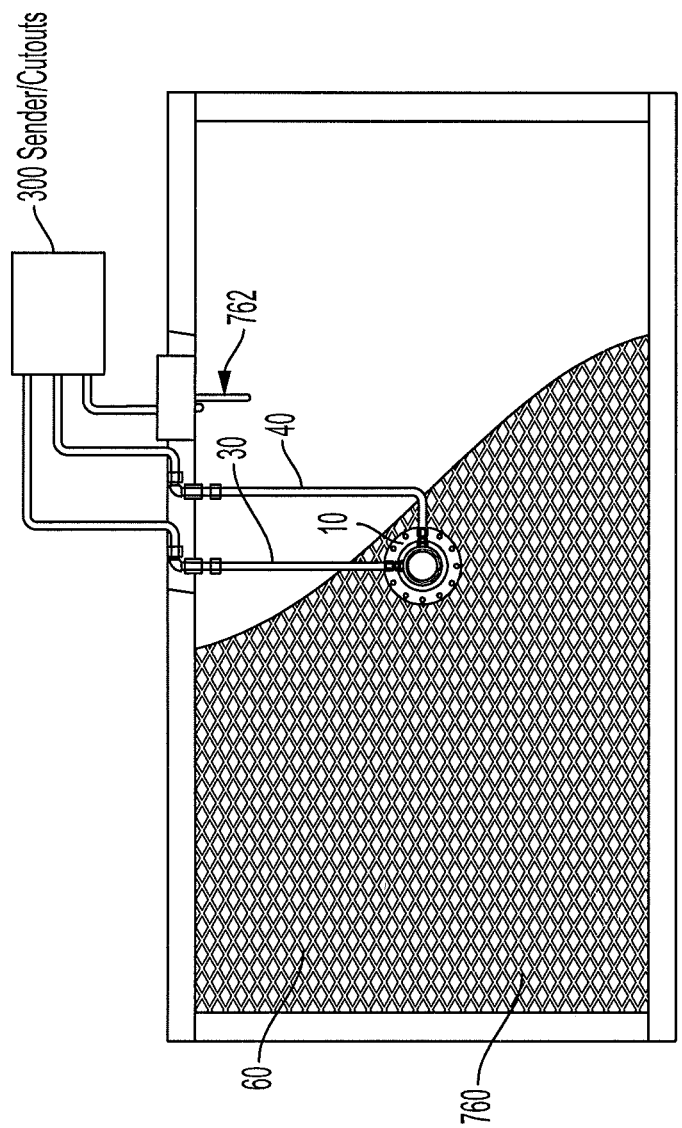
FIG. 14 shows a front view of an installed sensor device in accordance with disclosed embodiments.

FIGS. 12-14 show various examples of a uni-sensor being installed onto example fixed resistance 60 applications. FIG. 12 shows a sensor device 10 being installed on a fixed resistance 60, where the fixed resistance 60 is an air-inlet plenum louver 560. FIG. 13 shows three sensor devices 10 being installed on a fixed resistance 60, where the fixed resistance 60 is a metal grate duct inlet 660. FIG. 14 shows an example schematic installation of a sensor device 10 installed onto a fixed resistance 60, where the fixed resistance 60 is an expanded metal grate of fixed resistance 760. The sensor device is pneumatically connected through high-pressure tube 30 and low-pressure tube 40 to transmitter 300. Transmitter 300 is also electrically connected to a temperature sensor 762, which can be used to improve the accuracy of flow measurements.

Figure 15:
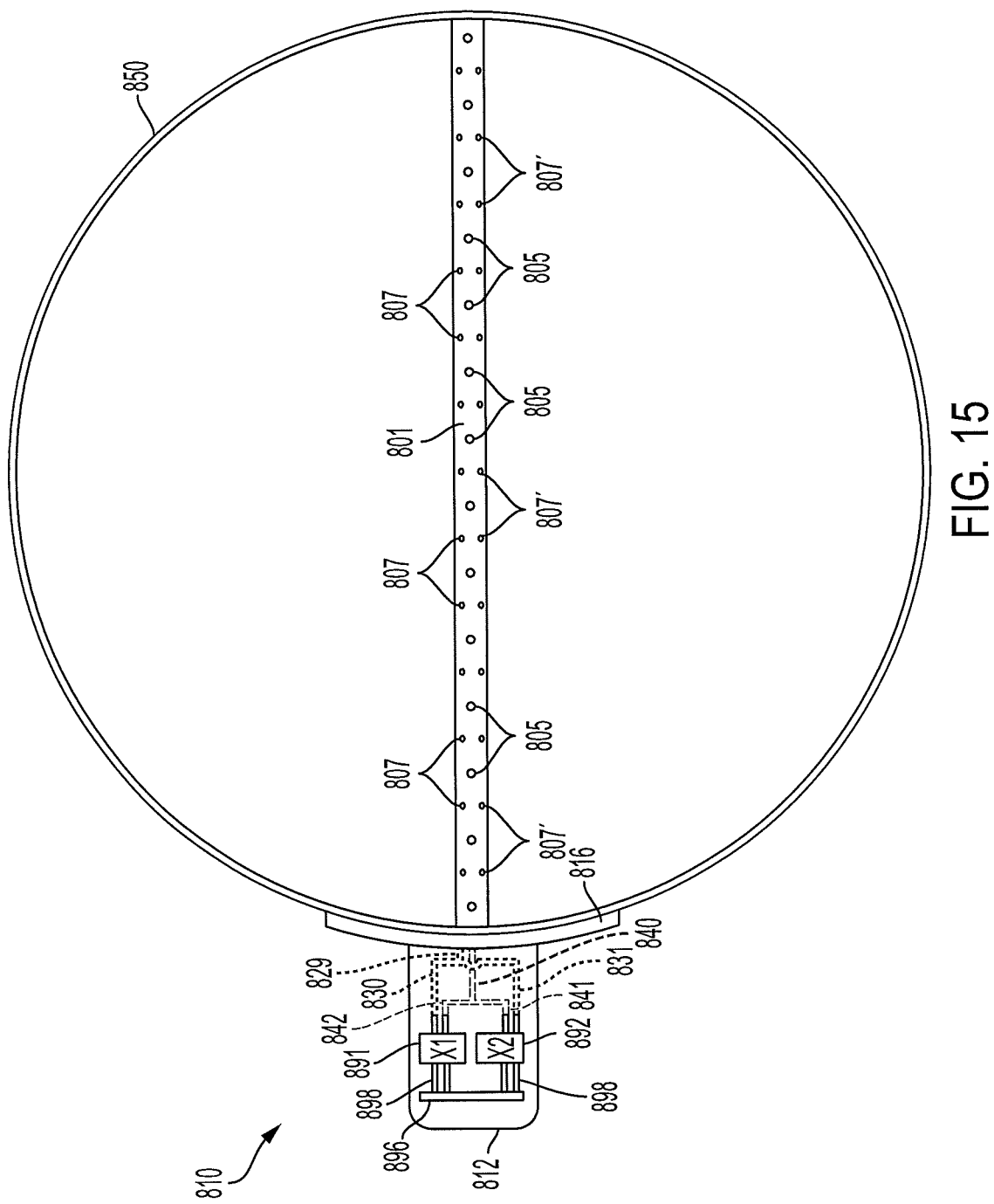
FIG. 15 shows a cross section of a sensor device installed with a duct in accordance with disclosed embodiments.
Figure 16:
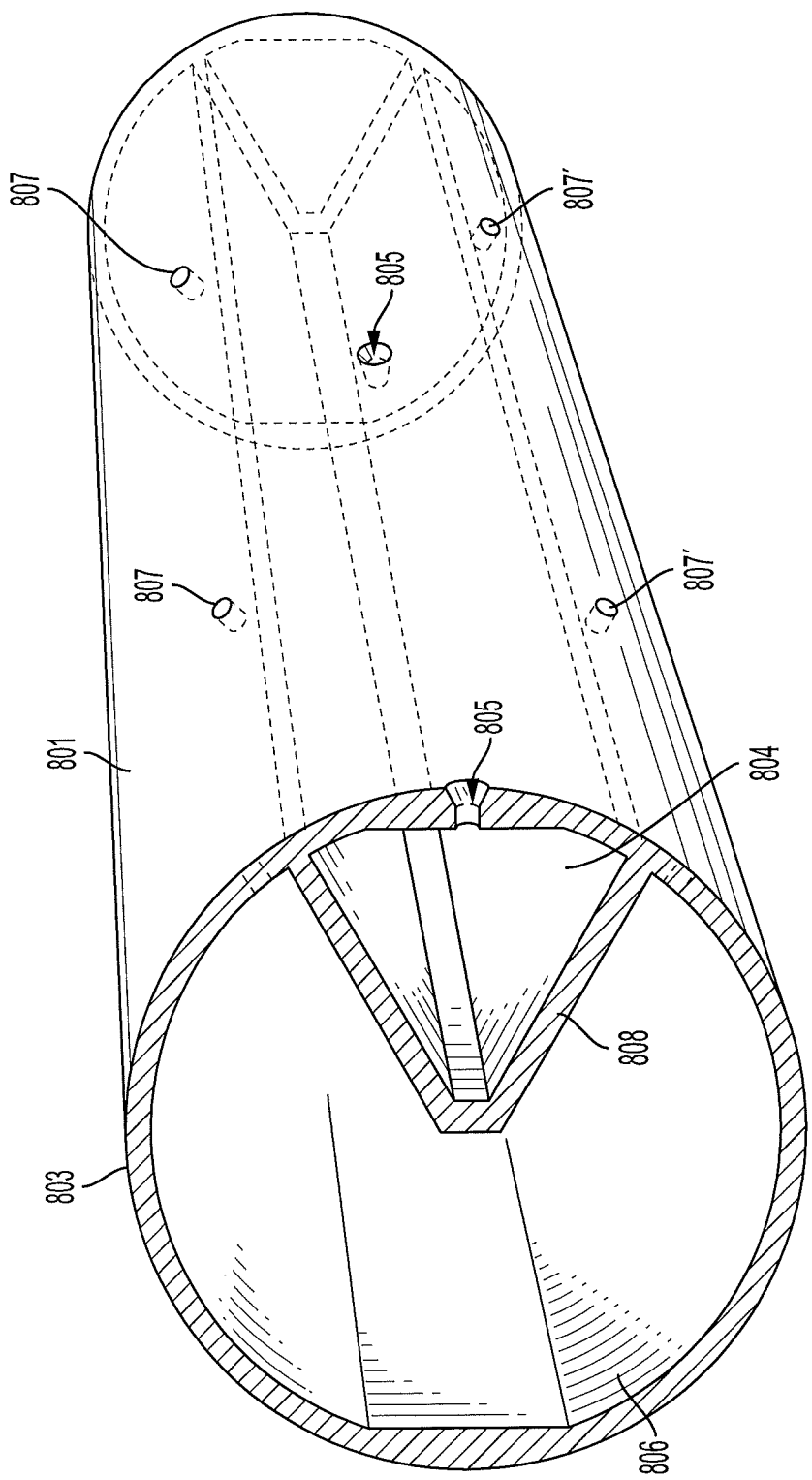
FIG. 16 shows a perspective view of a cross section of a transverse probe in accordance with disclosed embodiments.

FIGS. 15 and 16 shows an additional example embodiment using the flow through technology transducers of FIGS. 5-7 with a multi-conduit probe, for example that described in U.S. Pat. No. 4,559,835 (the '835 patent), issued on Dec. 24, 1985, the entirety of which is incorporated by reference herein.

The sensor device 810 of FIG. 15 is of similar construction to the sensor device 110 of FIGS. 5 and 7 in that it includes a housing 812 and a mounting plate 816. The sensor device 810 includes transducers 891, 892 within the housing 812 and includes no pneumatic piping to a remote transmitter. The pressure readings are similarly converted to electrical signals within the sensor device 810 housing 812 and the sensor readings are transmitted electronically.

Instead of the sensor device 810 being mounted with spacers, the sensor device 810 is mounted to a duct 850, which may also be a pipe or similar fluid conduit. The sensor device 810 is mounted such that each of the transducers 891,892 are in pneumatic connection with transverse probe 801, which may be the transverse probe of the '835 patent. The probe has static pressure ports 807,807' and total pressure ports 805 for respectively measuring the static and total pressures. The static pressure ports are each pneumatically connected to static pressure tube 840 and static pressure branch tubes 841,842 for pneumatic connection to transducers 891,892. The total pressure ports 805 are each pneumatically connected to total pressure tube 829 and total pressure branch tubes 830,831 for pneumatic connection to transducers 891,892. Transducers 891,892, and sensor 810, function similarly to, and have all of the advantages of, transducers 91,92, and sensor 110, and convert differential pressure into an electrical signal. However, in this example the advantages of sensor 810 are applied to transverse probe design 801.

The transducers 891, 892 will output an electrical signal indicative of differential pressure of air flow to circuit boards 896 through electrical connections 898. The circuit boards 896 have electrical connections to communicate the signal to a controller or transmitter through technologies known in the art, e.g., wired or wireless communication.

FIG. 16 is similar to FIG. 2 of the '835 patent and shows a perspective view of a cross section of transverse probe 801 (FIG. 15). Transverse probe includes a circular tube wall 801 having formed within it one conduit, total pressure conduit 804, for manifolding and averaging the total pressure sensed by the set of total pressure ports 805 bored in the tube wall and a second conduit, static pressure conduit 806, for manifolding and averaging the static pressure sensed by the sets of static pressure ports 807, 807' also formed in the tube wall. The spaced set of total pressure ports 805 formed in the tube wall 803 aligns substantially with the direction of flow, which is directed toward the opening of total pressure ports 805 and along the longitudinal axis of duct 850. Interior wall 808 with the tube wall 803 forms conduits 804,806 and separates one from the other.

Additional description and embodiments can be found in Appendix A hereof (VOLU-flo/OAM II Outdoor Airflow Measurement System), Appendix B hereof (VOLU-flo/OAM II Outdoor Airflow Measuring System Application Guide) and Appendix C hereof (VOLU-flo/OAM II Transmitter, Version 1.2 Differential Pressure Airflow & Temperature Measurement System, Installation, Operation and Maintenance Manual), each of which are incorporated herein by reference in their entirety as part of this disclosure.

What is claimed as new and desired to be protected by Letters Patent of the United States is:

1. A device for sensing airflow in a duct, the device comprising:
    a housing adapted to be mounted to a plate extending across the airflow of the duct, the plate having fixed airflow resistance;
    a high static pressure tube opening from the housing to the upstream side of the fixed resistance plate; and
    a low static pressure tube opening from the housing to the downstream side of the fixed resistance plate at a distance sufficient to avoid substantial airflow turbulence caused by the fixed resistance plate,
    wherein the housing is adapted to be mounted to an upstream side of the fixed resistance plate and the device is in communication with a transmitter and/or a controller for communicating pressure readings.

2. The device of claim 1, wherein at the fixed resistance plate is a louvre.

3. The device of claim 1, wherein at the fixed resistance plate is expanded metal.

4. The device of claim 1, wherein at least one of the high static pressure tube opening and the low static pressure tube opening includes a filter to filter debris in the airflow.

5. The device of claim 1, wherein the device is in electrical, wireless, and/or pneumatic communication with the transmitter and/or controller.

6. The device of claim 1, wherein the device further comprises at least two transducers within the housing, to generate signals based on relatively lower and higher pressure differentials, respectively.

7. The device of claim 6, wherein the two transducers are each connected to the low static pressure tube opening.

8. The device of claim 6, wherein the two transducers are each connected to a circuit and the circuit converts the signals to at least one of a wired and wireless communication protocol.

9. The device of claim 1, further comprising spacers between the housing and the plate.

10. The device of claim 9, wherein the spacers establish an airgap between the plate and the housing, the airgap being adapted to allow a static pressure to equalize through the spacers.

11. A device for sensing airflow in a duct, the device comprising:
    a housing;
    at least two transducers within the housing, to generate signals based on relatively lower and higher pressure differentials, respectively;
    a transverse probe having circular tube wall, and a total pressure conduit and a static pressure conduit within the circular tube wall;
    a static pressure tube from the housing to the static pressure conduit; and
    a total pressure tube from the housing to the total pressure conduit,
    wherein each of the two transducers are in pneumatic connection with each of the static pressure conduit and the total pressure conduit.

12. The device of claim 1, wherein the high static pressure tube opening opens in a direction different than the airflow.

13. The device of claim 1, wherein the low static pressure tube opening opens in a direction different than the airflow.

14. The device of claim 1, wherein the plate extending across the airflow of the duct is about perpendicular to the airflow.

15. The device of claim 1, wherein the plate comprises a plurality of passages for airflow through the plate.

16. A plurality of devices as in claim 1 adapted to be mounted on a single fixed resistance plate.

17. A device for sensing airflow in a duct, the device comprising:
- a housing adapted to be mounted to a plate extending across the airflow of the duct, the plate having fixed airflow resistance;
- a high static pressure tube opening from the housing to the upstream side of the fixed resistance plate; and
- a low static pressure tube opening from the housing to the downstream side of the fixed resistance plate at a distance sufficient to avoid substantial airflow turbulence caused by the fixed resistance plate,
- wherein at least one of the high static pressure tube opening and the low static pressure tube opening includes a sintered metal filter to filter debris in the airflow and the device is in communication with a transmitter and/or a controller for communicating pressure readings.

* * * * *